United States Patent [19]

Svyatsky et al.

[11] Patent Number: 4,561,352
[45] Date of Patent: Dec. 31, 1985

[54] ROTATABLE PRINT MECHANISM FOR PRINTING ON FRONT OR BACK OF MEDIA

[75] Inventors: Eduard Svyatsky, Chicago; K. George Rabindran, Morton Grove, both of Ill.

[73] Assignee: Bell & Howell Company, Chicago, Ill.

[21] Appl. No.: 668,140

[22] Filed: Nov. 5, 1984

[51] Int. Cl.[4] .............................................. B41F 13/24
[52] U.S. Cl. ....................................... 101/2; 101/233; 271/273
[58] Field of Search .................... 101/2, 232, 233, 234, 101/235; 400/124, 126, 583.3; 198/435; 414/134; 209/905; 271/294, 292, 272, 273, 274, 275

[56] References Cited

U.S. PATENT DOCUMENTS

| | | | |
|---|---|---|---|
| 2,912,925 | 11/1959 | Rabinow | 209/703 X |
| 3,071,261 | 1/1963 | Fischer . | |
| 3,103,285 | 9/1963 | Goodell et al. . | |
| 3,136,424 | 6/1964 | Silverschotz . | |
| 3,144,948 | 8/1964 | Henig . | |
| 3,246,751 | 4/1966 | Brenner et al. . | |
| 3,368,672 | 2/1968 | Heaney et al. . | |
| 3,661,383 | 5/1972 | Morrison | 271/273 |
| 3,913,719 | 10/1975 | Frey | 400/126 X |
| 3,944,211 | 3/1976 | Rasmussen et al. . | |
| 3,977,533 | 8/1976 | Hills et al. . | |
| 4,155,842 | 5/1979 | Wallace et al. | 271/273 X |
| 4,196,665 | 4/1980 | Rogers et al. | 400/124 X |
| 4,375,923 | 3/1983 | Hidaka . | |
| 4,381,705 | 5/1983 | Roes et al. | 101/66 X |
| 4,470,349 | 9/1984 | Godlewski | 101/233 |
| 4,480,827 | 11/1984 | Shultz et al. . | |

FOREIGN PATENT DOCUMENTS

98269 6/1983 Japan .................................. 400/605

Primary Examiner—Clifford D. Crowder
Attorney, Agent, or Firm—Laff, Whitesel, Conte & Saret

[57] ABSTRACT

An electromechanical automated document encoding apparatus is releasably constructed of modular components for accepting and transporting batch documents from either the left or the right. The apparatus is further capable of printing on a first side of a document or an opposite facing second side. A print module includes two parallel document receiving tracks, and a rotatable print head which moves responsive to movement of a table mounting the two document receiving tracks. The print head has two positions, and is capable of printing either on the front or rear of the document. Neither reversing print modes nor feeding batches of documents of different or varying thicknesses require realigning or repositioning of the printing head. Document sensors are an integral part of an adaptive control system optimizing apparatus productivity.

14 Claims, 8 Drawing Figures

ROTATABLE PRINT MECHANISM FOR PRINTING ON FRONT OR BACK OF MEDIA

BACKGROUND OF THE INVENTION

1. Field of the Invention

The present invention relates to a modular apparatus to encode media, including documents such as envelopes for machine assisted sorting. More particularly, the present invention relates to a modular encoding apparatus having a rotatable head and two parallel document print stations, which apparatus is automatically capable of printing a designated code on either side of a document.

2. Brief Description of the Background Art

Indexing devices are well known in the art, as are more specific structures for document or mail sorting stations. Practical sorting stations have been described in Goodell et al, U.S. Pat. No. 3,103,285 and Henig, U.S. Pat. No. 3,144,948. Goodell discloses an apparatus that records sorting information temporarily in magnetic tape storage. More commonly found devices mark pertinent information in codes on mail envelopes indirectly, such as Brenner et al, U.S. Pat. No. 3,246,751 which encodes pulsed magnetic changes on film tape, or directly, such as the disclosures of Rabinow, U.S. Pat. No. 2,912,925; Fischer, U.S. Pat. No. 3,071,261 and Heaney et al, U.S. Pat. No. 3,368,672. Fischer discloses a high speed, large scale letter feeder to supply conventional sorting stations, which may include conveyor belt means to enable an operator to read an envelope to be encoded, a keyboard to input coding information, and a printer to encode appropriate dot matrices on the backside of the envelope. Heaney et al includes a traditional letter feeder, conveyor means and keyboard elements, and encodes information as Brenner et al. with pulsed magnetic changes applied to magnetic material sprayed on envelopes. These magnetic codes are then copied by a reading head and used to shunt envelopes to appropriate storage bins. The operator of this device has manual control regarding the production pace.

However, prior art encoding machines are replete with inconveniences. For example, it is often desirable to imprint a code on one side of an envelope or the other, or both, depending primarily when the code will be used. For example, large corporations often wish to have mail encoded for internal routing purposes, and special departmental encoding is desired to be applied on the reverse side of an envelope. Naturally, the Post Office has great need for a machine capable of printing an automatically readable code on the front side of an envelope representing a Zip Code. It would be of great usefulness to have an apparatus with the capacity to apply a code to both sides of an envelope. However, no previously available encoding machine is designed to do so and none is capable of being adapted to do so without considerable expense. Additionally, although all mail facilities are not uniform, no encoding machine system discovered is capable of reversing document flow direction, save by literally turning the machine around, which of course, turns the operator around as well. Having a single encoding desk design capable of both reversing flow direction and reversing print orientation would obviously result in significant manufacturing and tooling cost savings to any producer, as well as tremendously reducing maintenance levels of part supplies needed in support thereof. This of course lowers costs to all parties concerned, including the consumer.

SUMMARY OF THE INVENTION

It is an object of the present invention to provide a document encoding apparatus produced of releasably attachable and interchangeable modular components.

Another object of this invention to provide a document encoding apparatus which is adapted to print desired images on either side of a document passing on a linear feed document processor.

A further object of this invention to provide a document encoding apparatus designed to require less maintenance and to effortlessly expose substantially all major printer module elements for cleaning and servicing.

In a broad embodiment therefore, these objects and others are provided by an improved document encoding apparatus including releasably and reversibly assembleable modular components. These include primarily a feeder module, a transport module, a print module, and a stacker module. The transport module preferably includes a data input keyboard and a CRT monitor. The printer module includes a support platform, a pair of spacially distant parallel rails mounted to the support platform, and a table slidingly attached to the runners. The table includes a pair of document or envelope receiving tracks or channels spaced a distance apart and oriented perpendicular to the paired runners, which tracks are adopted to transport a document past an ink jet printing head rotatably mounted on a turntable disposed between the two receiving tracks. A rack and pinion gear rotates the print head 180 degrees as the sliding table is displaced from one extreme to the other extreme. Each receiving track includes powered envelope feed rollers and opposed pressure rollers to advance an envelope. Both the guides and pressure roller mounts pivot for easy access thereto.

While the items to be sorted are referred to as envelopes in the preferred embodiment, it will be understood that the invention is applicable to many types of documents which are coded to be sorted and delivered to a multiplicity of predetermined destinations, and the term "envelope" is intended to include any such objects.

BRIEF DESCRIPTION OF THE DRAWINGS

In the drawings, which constitute a part of this specification, a preferred embodiment demonstrating the various objectives and features of the invention is set forth in the accompanying drawings wherein.

DETAILED DESCRIPTION OF THE INVENTION

Figure 1:
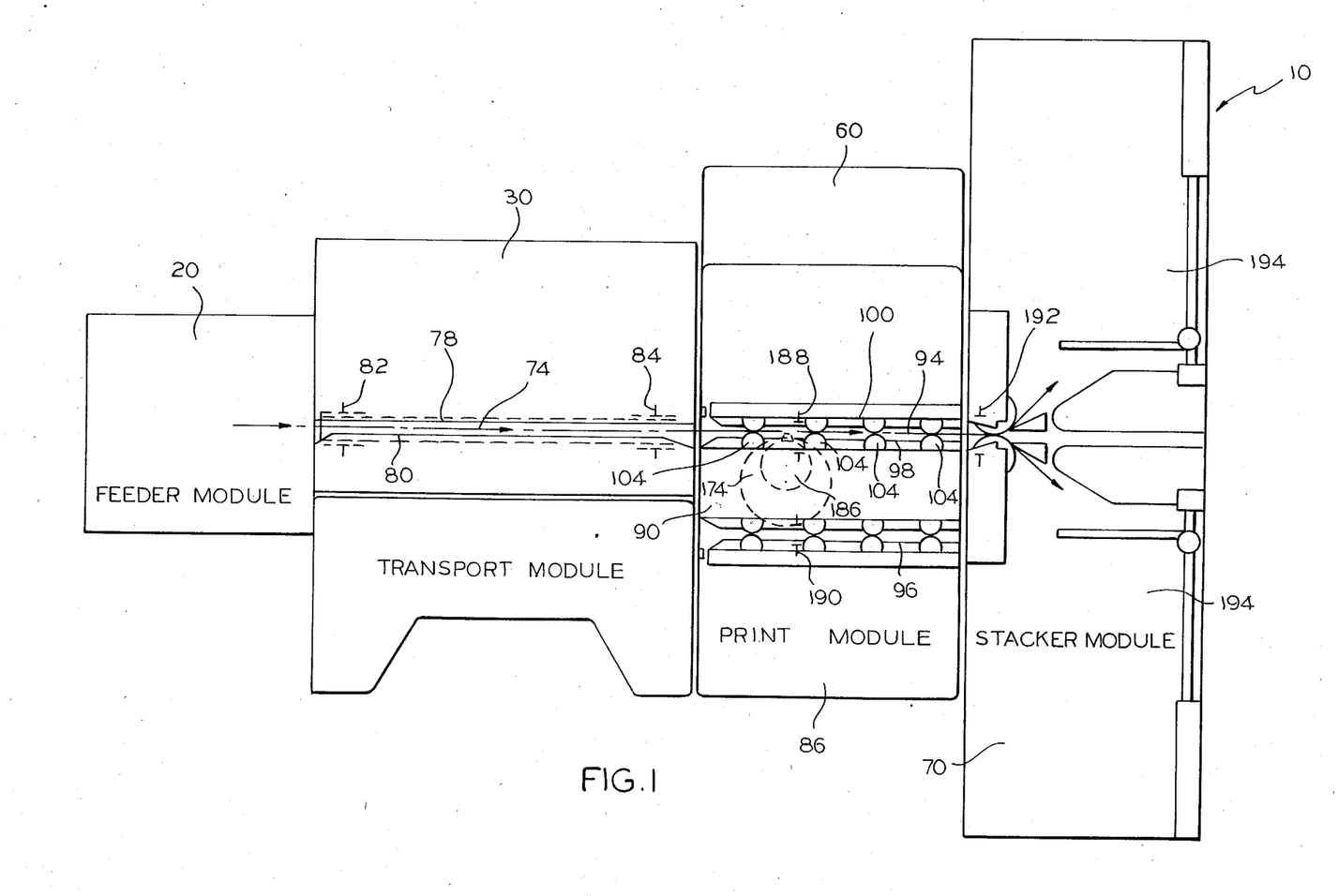
FIG. 1 is a top schematic view of the four primary modular elements of the present invention showing a typical document feed path.
Figure 2:
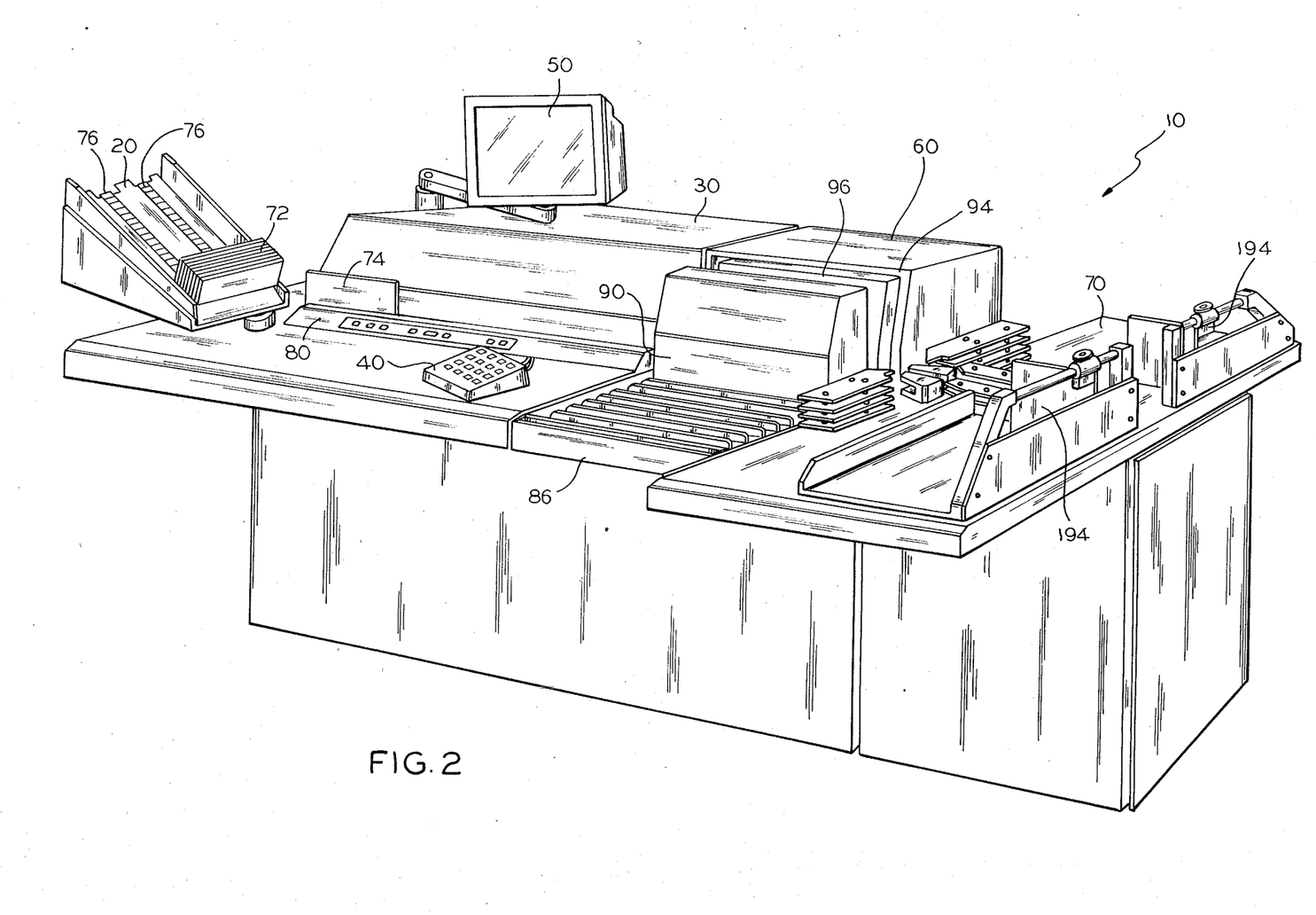
FIG. 2 is a perspective view of the four primary modular elements of the present invention, with the keyboard and monitor.

Referring to FIGS. 1 and 2, the present invention a linear feed document processor generally designated 10, and consists substantially of four detachable but interrelated modules: a feeder module 20, a viewing transport module 30, a printing module 60, and a stacking module 70. Viewing transport module 30 includes a data input keyboard 40 and a CRT monitor 50. The function of feeder module 20 is to separate envelopes from a stack and to feed them to the conveyor raceway or receiving track of the transport module 30. The viewing transport module's function is to move envelopes in front of the operator. After the operator reads the zip code and enters the appropriate key on the data input keyboard 40, the envelopes are fed to printing module 60. The printing module prints a bar code representing the appropriate zip code on either the front or back of the envelope, as will be explained, as determined by the operator. The function of stacking module 70 is to separate envelopes with printed bar codes from envelopes which have been rejected, and to stack them separately.

Feeding module 20 and transport module 30 may be of several well-known prior art designs. Feeder module 20 temporarily maintains a supply of envelopes 72 to be processed. An intermittently actuated transfer means (not shown) removes lead envelope 74 from supply stack 72 and places the envelope on viewer transport module 30. Feeder module 20 also includes endless feeder belt means 76 upon which envelope stack 72 rests. Belt 76 travels either continuously or intermittently, thereby conveying envelope stack 72 downwardly such that lead envelope 74 is consistently in position for removal by intermittently actuated transfer means. Intermittent transfer means may as a matter of design choice be located as part of feeder 20 or of transporter 30.

Transport module 30 includes an endless conveyor belt 78 which serially transports consecutive envelopes 74 after each envelope 74 has been transferred to transport module 30 from feeder module 20. In a preferred embodiment, conveyor belt 78 may include perforations connected to a vacuum source to ensure retention of envelope 74. Transporter 30 may also include restraining rail means 80 or pressure guide means (not shown) to maintain envelope 74 in a vertical position.

In one embodiment, conveyor belt 78 may be oriented on transport module 30 beneath envelope 74 perpendicular thereto as best seen in FIG. 1, and travelling generally parallel to the length of envelope 74. The envelope will encounter and trigger sensing means 82 as it travels along conveyor belt 78. Sensing means 82 may comprise any well-known mechanical, optical or electrical switching component. In one preferred embodiment, maintenance-free photo eye means are selected.

Triggering of sensing means 82 by envelope 74 controls the movement of conveyor belt 78, and in an alternate embodiment, may control the movement of feeder belt 76 (FIG. 2) as well. If linear feed document processor 10 is not sufficiently prepared to ultimately sort envelope 74 at the moment envelope sensing means 82 is triggered, conveyor belt 78 stops. Conveyor belt 78 will not thereafter resume transportation of envelope 74 until document processor 10 is prepared to encode or reject envelope 74. Whether document processor 10 is sufficiently prepared to imprint a code on envelope 74 depends upon whether document processor 10 has received the appropriate instructions from the operator. The operator keys the addressed zip code to be encoded upon envelope 74 in keyboard module 40. Keying in the zip code prepares document processor 10 to ultimately print a bar code form of the zip code on the envelope, and to subsequently sort the envelope. By automatically minimizing the delay between the moment that document processor 10 has received the operator's instructions through keyboard 40, and the moment envelope 74 encounters envelope sensing means 82, an adaptive control system is created whereby productivity may effectively be optimized.

An alternate preferred embodiment includes second envelope sensing means 84 located at the terminal of conveyor belt 78 on transport module 30. When first envelope sensor 82 is triggered by the leading edge of envelope 74, conveyor belt 78 stops for a predetermined variable amount of time. This allows the operator to read a stationary zip code rather than decipher a moving one, thereby yielding greater accuracy. Conveyor belt 78 then manually or automatically resumes transportation. When first envelope sensor 82 detects the trailing edge of envelope 74, feeder belt 76 is activated to deliver a subsequent envelope to conveyor belt 78. If a complete zip code sequence or reject instruction has not been received when second envelope sensor 84 detects the leading edge of envelope 74, conveyor belt 78 again stops transportation until such instructions are entered. As before, an adaptive control system may be utilized whereby conveyor belt 78 speed and/or first envelope sensor 82 delay time may be automatically varied to optimize productivity. A display on CRT monitor 50 not only shows menu choices and instructions for setting up document processor 10 for operation, but also shows what instructions the operator has selected on keyboard 40. After document processor 10 has received the operator's instructions, conveyor belt 78 transports envelope 74 to printing module 60.

Printing module 60 (FIG. 3) includes a frame 86 supporting a pair of parallel rails 88 oriented perpendicular to the direction of travel of envelope 74, and a sliding table or plate 90 mounted on rails 88. Conventional engaging glide means 92 are attached to the underside of table 90 and have apertures therein which slidably engage rails 88. Glide means 92 ensure that table 90 remains seated on rails 88 and allow table 90 to be laterally displaced smoothly and effortlessly. Table 90 includes two parallel, spaced apart envelope receiving tracks 94, 96. Receiving tracks 94, 96 are located and constructed substantially symmetrically about line A—A of FIG. 3.

Figure 3:
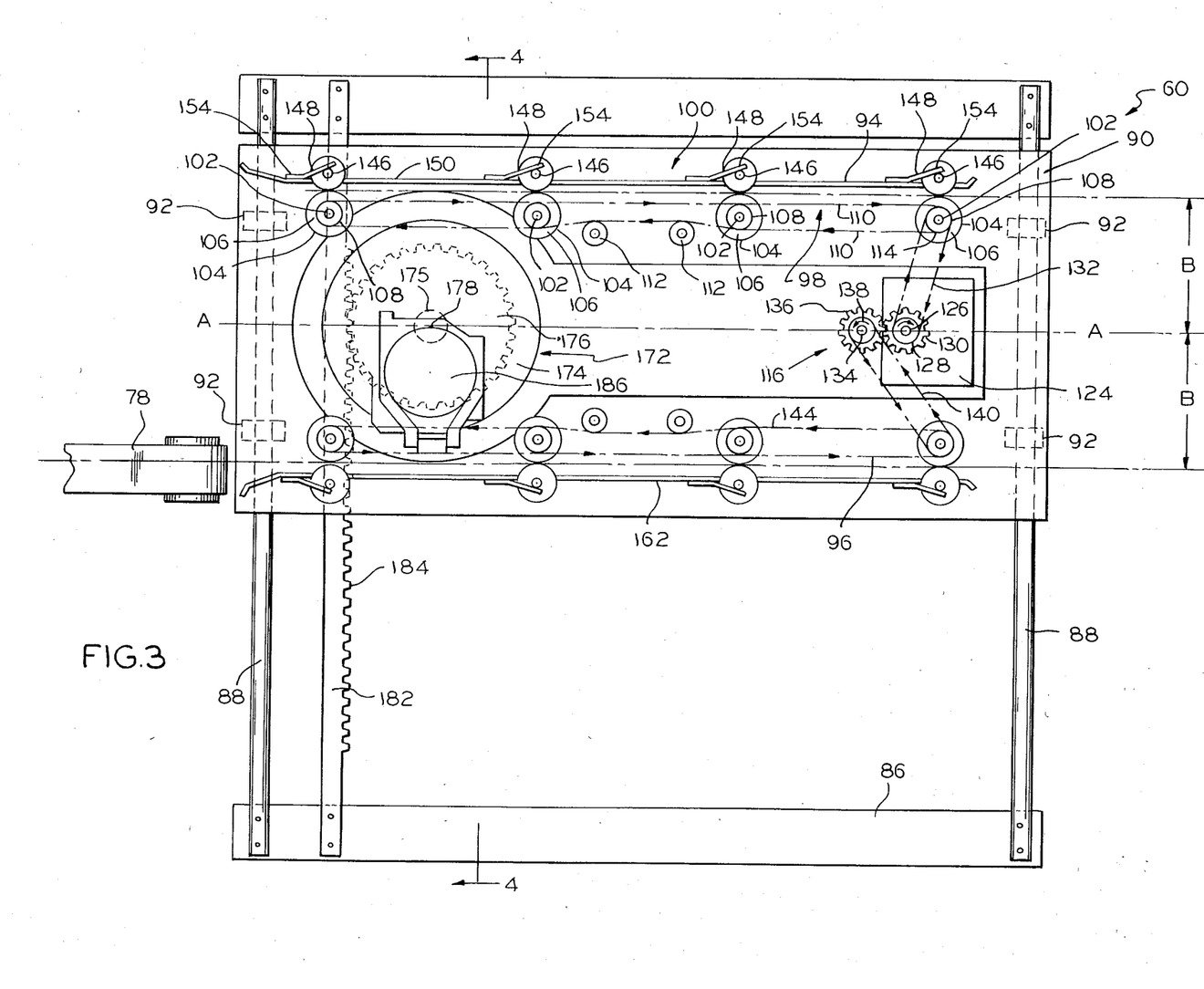
FIG. 3 is a partially cut-away top plan view of the printer module of the present invention.

Table 90 is constructed such that when it is laterally displaced in one extreme position, receiving track 94 is aligned with the exit of conveyor belt 78 of viewing transport module 30, and when sliding table 90 is laterally displaced in the other extreme position, receiving track 96 is aligned with the exit of conveyor belt 78 of viewing transport module 30. Table 90 is manually moved between its two extreme positions by the operator depending upon which side of envelope 74 is to be imprinted, and conventional releasable latch means (not shown) restrain table 90 in either extreme position as desired.

Since receiving tracks 94, 96 are mirror images of one another, receiving track 94 alone will be discussed. Disclosures herein apply to receiving track 96 as well.

Receiving track 94 consists of inner envelope guide means 98 and outer envelope guide means 100. Inner guide means 98 comprises a series of vertical shafts 102 linearly arrayed axially adjacent the path of envelope 74. Each vertical shaft 102 includes a pair of equivalent envelope feed rollers 104 located substantially at either end of vertical shaft 102 and mounted on shaft 102 by means of self-aligning bearings to permit rapid assembly and disassembly. The circumferential periphery of each feed roller 104 is preferably covered with a substantially incompressible substance 106 of a relatively high coefficient of friction, such as certain polymer-rubber admixtures. Each vertical shaft 102 further includes equivalent pulley means 108 (FIG. 3) connected by an endless elastomeric belt 110 to drive each vertical shaft 102 in the same direction at the same rate of speed. Rotating spring loaded polymeric idler wheels 112 ensure proper tension in belt 110.

One vertical shaft 102 additionally includes drive pulley means 114 connected to motor means 116 for powering inner guide means 98. Motor means 116, also permanently and rigidly attached to carrier bracket 122, comprises an electric drive motor 124 located substantially underneath carrier bracket 122. Motor drive shaft 126 is vertically oriented and includes motor pulley 128 located on the end thereof. Timing belt 132 extends between and connects drive pulley 114 and motor pulley 128. Countershaft 134 is rotatably mounted to carrier bracket 122, and is oriented both parallel and adjacent to motor shaft 126. Countershaft 134 includes gear 136 engagingly positioned with gear 130 on shaft 128. Countershaft pulley 138 is operatively connected with drive pulley 140 for receiving track 96 by means of elastomeric timing belt 142. When motor 124 is energized, motor shaft 126 and countershaft 134 rotate in opposite directions thereby ensuring that the rotation of elastomeric belt 110 and its mirror image 144 is symmetric about centerline A—A.

Figure 4:
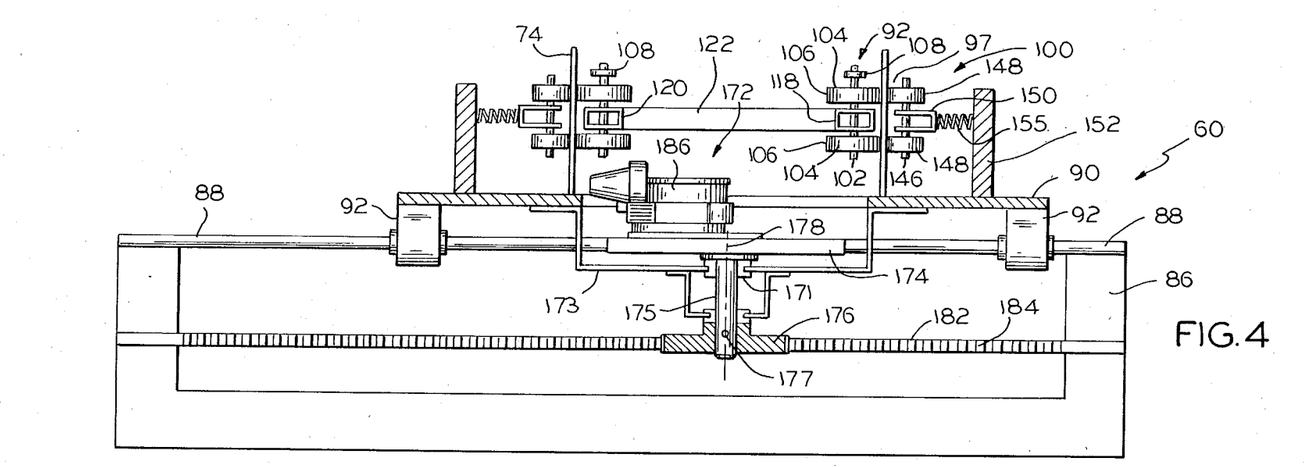
FIG. 4 is a horizontal cut-away side view of the printer module taken generally along line 4—4 of FIG. 3.
Figure 5:
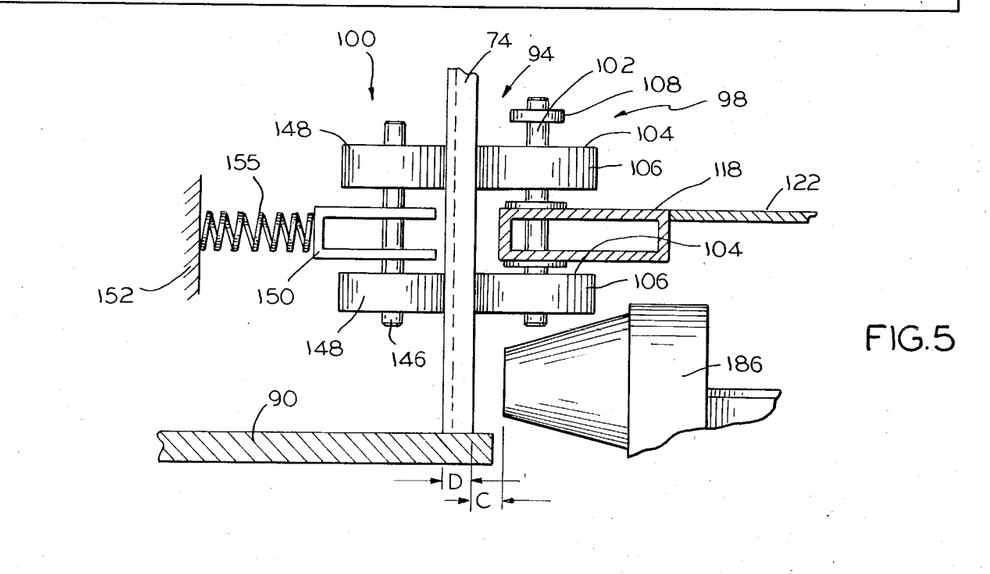
FIG. 5 is an enlarged cut-away and detail side view of the print head and envelope guide means of the printer module.

Outer envelope guide means 100 comprises a series of vertical shafts 146 vertically and linearly arrayed substantially opposite inner vertical shafts 102 across the path of travel of envelopes 74. Each vertical shaft 146 includes a pair of rotatable pressure roller means 148 located substantially at either end of vertical shaft 146. Each vertical shaft 146 is rotatably mounted on outer shaft carrier 150. Outer shaft carrier 150 is moveably mounted in outer housing 152, inwardly biased towards centerline A—A by cantilevered flat springs 154 (FIG. 3). Alternately, shaft carrier 150 may be rigidly mounted in outer housing 152 and each vertical shaft 146 may be inwardly biased by a coil spring 155 (FIGS. 4, 5). Contact force against the envelope is developed by flat springs 154 for each pressure roller set, which allows the pressure rollers 148 to adjust to varying envelope thicknesses D (FIG. 5), while maintaining constant frictional contact between envelope and feed rollers 104. Pressure rollers 148 are idler rollers, and are not driven by belt 110.

Figures 7, 8:
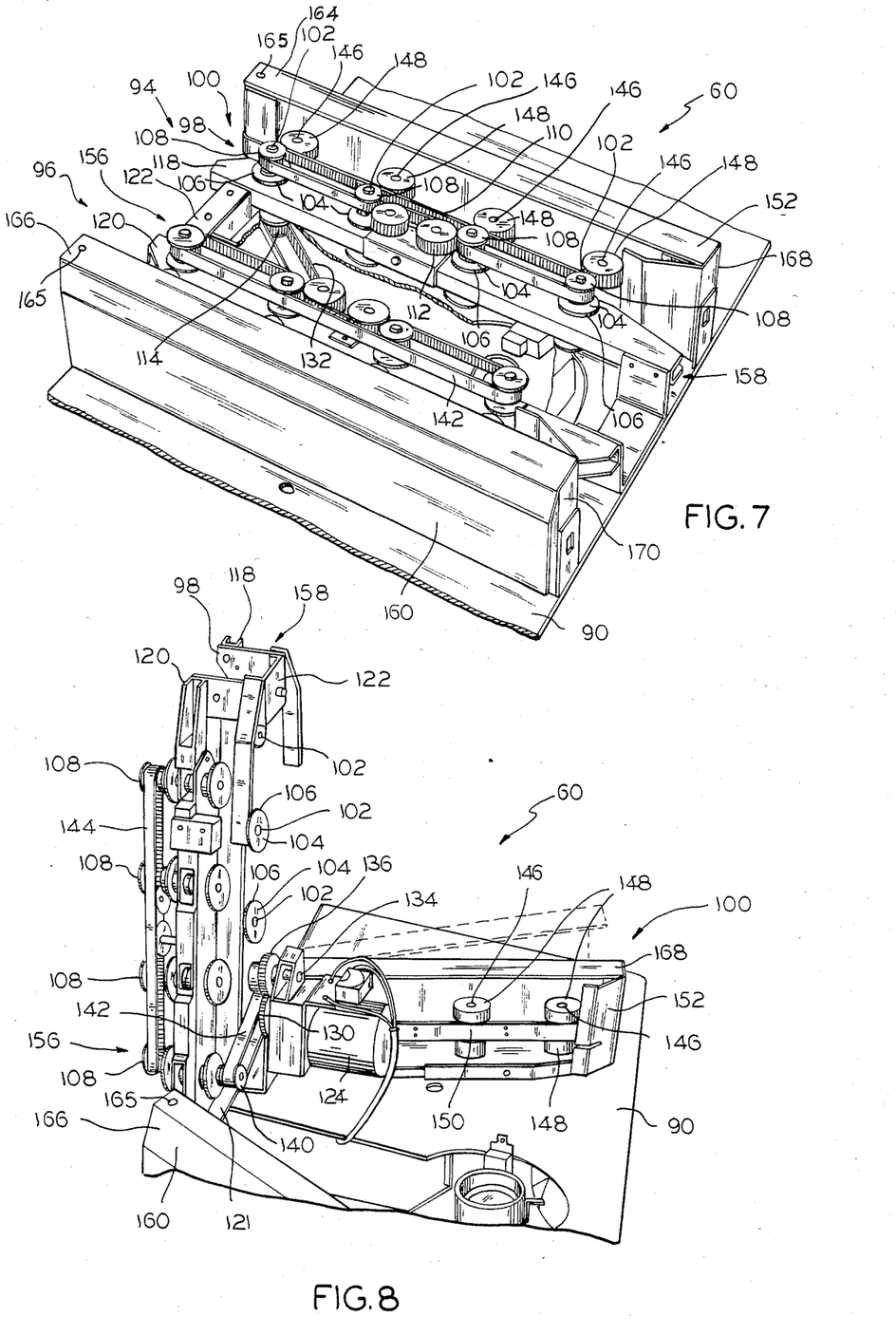
FIG. 7 is a perspective view of the sliding table of the printer module in an operating position, showing the document feed means and the document guide means.
FIG. 8 is a perspective view of the envelope guides of the sliding table, shown released and raised for maintenance or replacement.

Referring to FIGS. 7 and 8, carrier bracket 122 is pivotally mounted to table 90 at first end 156 by means of a horizontally disposed hinge assembly 121 (FIG. 8), and releasably attached to table 90 at second end 158 by a suitable latch assembly. Similarly, U-shaped outer housings 152, 160 containing outer shaft carriers 150, 162 respectively, are pivotally mounted to table 90 at first end 164, 166 by means of pivots 165 (FIG. 8) and releasably attached to their respective outer shaft carrier 150, 162 at second end 168, 170 by suitable latch means. Outer housings 152, 160 pivot outwardly in a horizontal plane when released, and carrier bracket 122 pivots upward in a vertical plane when released (FIG. 8). Releasing outer housing 152, 160 and carrier bracket 122 allows unimpaired access to printer 60 and the entire document feed path for routine inspection, maintenance, clearing jams, and repairs to receiving tracks 94, 96, motor means 116, printing means 172, and the remaining operating elements of printer module 60.

Printing means 172 (FIGS. 3, 4, 6) consists of turntable 174 rotatably mounted to a bracket 173 by suitable bearing means 171. Bracket 173 is mounted to the underside of table 90. A shaft 175 extends downwardly from turntable 174 through bearing 171, and includes gear means 176 rigidly connected thereto by means of pin 177. Turntable centerline 178 is positioned directly beneath centerline A—A (FIG. 3). Rack gear 182 is permanently mounted to platform 86 such that rack gear teeth 184 mesh with turntable gear 176. Turntable gear 176 is of sufficient diameter whereby one-half of the circumference of gear 176 exactly equals the travel of table 90 along rails 88 from one extreme to the other extreme. Thus, when receiving track 94 is aligned with the envelope path, and table 90 is displaced such that receiving track 96 comes into alignment with the envelope path, turntable rotates exactly one hundred eighty degrees under the influence of rack and pinion gear means 176, 182.

Figure 6:
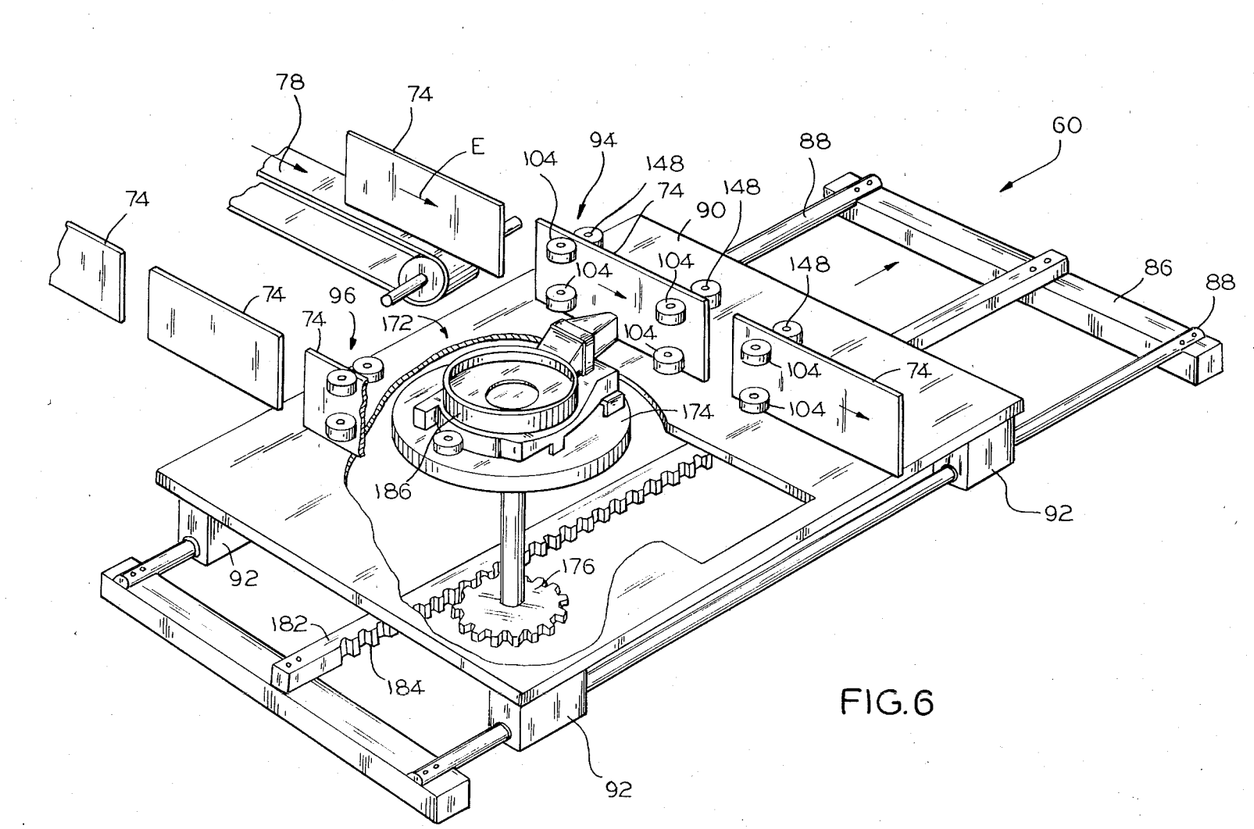
FIG. 6 is a cut-away perspective view of the printer module of the present invention, showing in particular the drive mechanism for the rotating print head turntable and its relation to the two parallel, spaced apart document receiving tracks.

In the preferred embodiment, a conventional ink jet printer means 186 is mounted off center on the upper surface of turntable 174, such that ink jet printer 186 is aligned perpendicular and adjacent to either receiving track 94, 96 when table 90 is displaced (FIGS. 4, 6). In this manner, ink jet printer 186 may effortlessly adapt to print either the front or back side of envelope 74. Additionally, since the center of rotation 178 of turntable 174 is mounted along line A—A, and receiving tracks 94, 96 are constructed symmetrically equidistant from line A—A, ink jet printer 186 is always in a proper position when table 90 is moved from one position to another.

As stated previously, the two parallel envelope receiving and transporting tracks 94, 96 are developed symmetrically about centerline 178 (FIGS. 3, 4) of turntable 174, whereby the distance from turntable centerline 178 to each of the separate receiving tracks 94, 96 are exactly equal. Additionally, the distance between the centerline 178 of turntable 124 and the outwardly facing surfaces of feed rollers 104 of each receiving tracks 94, 96 are also equal. This insures that a fixed distance B (FIG. 3) is maintained between centerline 178 of turntable 174, and each of the two printing surfaces on envelope 74 as the envelope passes adjacent ink jet printer 186. This, in turn, insures that a fixed distance C (FIG. 5) is maintained between the tip of the nozzle of ink jet printer 186 and the surface on envelope 74 to be printed, regardless of the thickness (D) of the envelope. For this reason, envelope feed rollers 104 are located at fixed positions inside the boundaries of the two receiving tracks 94, 96 while the pressure rollers 148 are located on moveable shaft carrier 150 outside the receiving tracks to accommodate any variation in envelope thickness D (FIG. 5) without varying the distance C from print head 186 to the face of envelope 74 to be printed.

The operation of print module 60 is as follows: motor drive shaft 126 is rotated by motor 124, which in turn drives gears 130, 136 and timing belts 132, 140. This imparts motion to the feed mechanisms of receiving tracks 94, 96 through timing belts 110, 144, pulleys 108, and envelope feed rollers 104. Table 90 has two possible positions: one for printing a bar code on the front of envelope 74, and a second position for printing a bar code on the rear of an envelope 74. Changing the position of table 90 from one position to the other is accomplished by releasing a suitable latch (not shown). This permits table 90 to be selectively moved horizontally along rails 88 in a direction perpendicular to the flow direction of the feed of envelopes 74, as seen by the arrow E in FIG. 6. A second releasable latch (not shown) on the other end of table 90 maintains the table in its second position.

Before starting the imprinting process, the operator selects the proper position of table 90 for printing a bar code on either the front or back of an envelope, as desired. The envelopes 74 are transferred from transport module conveyor belt 78 and are fed between envelope feed rollers 104 and pressure rollers 148 past the nozzle of ink jet printer 186. As the envelope 74 passes the nozzle, a signal generated by keyboard 40 activates ink jet printer 186 and a bar code is printed on the appropriate side of the envelope as the envelope is moved past the nozzle of the ink jet printer.

Since the distance between the nozzle of printer 186 and the surface of envelope 74 to be imprinted is maintained at a constant value C (FIG. 5) regardless of the thickness of envelope 74 and regardless of whether table 90 is in its first or second position, the bar codes are always printed legibly.

To print a bar code on the opposite side of envelope 74, the operator releases the aforementioned latch, and slides table 90 over rails 88, where the opposing latch secures table 90 in its second position.

As table 90 moves on rails 88, pinion gear 176 meshes with rack gear 182 which is fixed to frame 86, and rotates shaft 175 and turntable 174. The pitch diameter of pinion gear 176 is such that it allows precisely one hundred eighty degrees rotation of turntable 174 and ink jet printer 186 for printing adjacent either receiving track 94 or 96. Therefore, the distance 2B (FIG. 3) between the two receiving tracks 94, 96 is equal to one-half the circumference of pinion gear 176. When table 90 is moved from one position to another, ink jet printer 186 will rotate to the proper position for printing bar codes on one side of envelope 74 or the other.

Although printer 186 has been referred to as an ink jet printer, it is to be understood that printer 186 may also be any other suitable print apparatus, such as a ballistic impact print head, or the like.

Printer 60 includes third and fourth envelope sensing means 188, 190 operably mounted in receiving track 94, 96 respectively (FIG. 1). The triggering of third or fourth envelope sensing means 188, 190 activates energization of ink jet printer 186 to initiate the bar code printing routine when the keyboard 40 reject routine has not been selected. After a complete bar code sequence has been printed, envelope 74 is transferred to sorter module 70.

Sorter devices 70 as employed in the present document processor 10 are well-known. Envelope 74 encounters a fifth envelope detecting means 192 (FIG. 2), which initiates a routine by which envelope 74 is automatically diverted to appropriate bins 194. Bins 194 may limit envelope 74 diversion to encoded or rejected mail, or may further discriminate between encoded mail.

The document processor 10 of the present invention further includes automatic jam routines which continuously sample time periods between the various envelope sensing devices 82, 84 188 190, or 192. If any sample time period exceeds a pre-set value, a jam error message is displayed on CRT monitor 50, following which document processor 10 automatically deenergizes, allowing the operator to correct the jam condition and restart processor 10.

Each module 20, 30, 60, and 70 releasably and quickly attaches to its functional neighbor by using conventional fasteners. The envelope path of each module 20, 30, 60, 70 is symmetrically located between fastener means oriented perpendicularly to each module. This novel arrangement effectively allows processor 10 to be temporarily constructed as to thereby fit unique applications by feeding envelopes from left to right or right to left by reversing the positions of the modules.

It should be understood that various modifications can be made to the preferred embodiments disclosed herein without departing from the spirit and scope of the invention or without the loss of its attendant advantages. Thus, other examples applying the principles described herein are intended to fall within the scope of the invention provided the features stated in any of the following claims or the equivalent of such be employed.

We claim:

1. A document printing system adapted to move documents serially past a print head for printing information on a printing surface of each document, said system comprising:
   a table slidably mounted to a fixed support, said table being moveable laterally between first and second positions;
   a first document receiving track on said table for moving said documents in a first path past said print head for printing on a first side of said document when said table is in said first position;
   a second document receiving track on said table and disposed in spaced relation and parallel to said first document receiving track for moving said documents in a second path past said print head for printing on a second side of said document when said table is in said second position.

2. The document printing system of claim 1 wherein said print head is rotatably mounted on said fixed support between said first document receiving track and said second document receiving track, said system further comprising:
   means adapted for rotating said print head, said means automatically orienting said print head generally perpendicular to each document, said print head rotating means and said first and second document receiving tracks being cooperatively interrelated for locating said print head at a predetermined consistent distance from each document printing surface.

3. The document printing system of claim 1 wherein said first and said second document receiving tracks each comprise:
   a plurality of rotatable document feed rollers, arrayed linearly along a first bracket;
   a plurality of rotatable pressure rollers arrayed linearly along a second bracket, and disposed generally parallel and adjacent to said plurality of document feed rollers, said pressure rollers biased towards said document feed rollers to form a document path between said document feed rollers and said pressure rollers; and drive means to rotate said document feed rollers.

4. The document printing system of claim 3 wherein said first bracket pivotably attaches to said table at one end of said first bracket and releasably attaches to said table at a second end of said first bracket.

5. The document printing system of claim 4 wherein said second bracket pivotably attaches to said table at one end of said second bracket and releasably attaches to said table at a second end of said second bracket, whereby said first and second brackets are adapted to pivot away from said document path to permit operator access to said feed rollers, pressure rollers, and print head.

6. The document printing system of claim 2 wherein said table is reciprocally slideable perpendicular to said document paths of said first and second document receiving tracks.

7. The document printing system of claim 6 wherein said print head rotating means comprises:
   rack gear means mounted to said support; and
   pinion gear means coaxially depending from said print head rotating means and rigidly connected thereto, wherein said pinion gear meshes with said rack gear whereby said print head rotating means rotates when said table is slideably displaced.

8. The document printing system of claim 7 wherein said print head rotating means further includes:
   turntable means mounted on a shaft which extends between said turntable means and said pinion gear means;
   said shaft rotatably mounted in said support;
   said print head mounted on said turntable means adjacent the outer edge of said turntable means and off center relative to the center line of said shaft;
   said pinion gear having a predetermined pitch such that movement of said table from said first position to said second position causes said pinion gear and said turntable to rotate one hundred eighty degrees, whereby said print head moves from a first position adjacent said first document receiving track to a second position adjacent said second document receiving track as said table is slidably moved between said first and second positions.

9. The document printing system of claim 3 wherein the lateral position of said first bracket of each document receiving track is fixed relative to each respective document path, and the lateral position of said second bracket of each document receiving track is moveable towards and away from each respective document path; said print head being oriented adjacent said feed rollers simultaneously with being oriented perpendicular to each said document; each said second bracket being biased toward each respective document path; whereby the distance between said print head and said document printing surface remains constant regardless of the thickness of said document moving past said print head.

10. The document printing system of claim 1 including:
   a viewing transport module disposed adjacent said fixed support and having document transport means thereon for transporting said documents serially across said viewing transport module to one end thereof;
   said one end of said viewing transport module releasably disposed adjacent said fixed support;
   said first document receiving track being aligned with said document transport means when said table is in said first position, and said second document receiving track being aligned with said document transport means when said table is in said second position.

11. The document printing system of claim 10 including:
   a stacker module disposed adjacent said fixed support at a location opposite said viewing transport module and having document sorting means thereon to sort said documents after said information has been printed on said documents;
   said stacker module releasably attached adjacent said fixed support;
   gate means on said stacker module to receive said documents after said documents have traversed said fixed support;
   said first document receiving track being aligned with said gate means when said table is in said first position, and said second document receiving track being aligned with said gate means when said table is in said second position.

12. The document printing system of claim 11 including:
   document feeder means to serially deposit said documents on said viewing transport module.

13. The document printing system of claim 10 including:
   keyboard input data means operatively controlling said print head, whereby data recorded on said document in language format and observed by an operator as said document is transported along said document transport means of said viewing transport module is entered into said keyboard input data means to enable said print head to print said data on a printing surface of said document in code format as said document moves past said print head.

14. The document printing system of claim 13 including:
   visual display monitoring means operatively connected to said keyboard input data means whereby said operator can ascertain the data entered by said keyboard input data means.

* * * * *